(12) United States Patent
Jansen et al.

(10) Patent No.: US 11,693,766 B2
(45) Date of Patent: Jul. 4, 2023

(54) RESOURCE ALLOCATION IN MICROSERVICE ARCHITECTURES

(71) Applicant: INTERNATIONAL BUSINESS MACHINES CORPORATION, Armonk, NY (US)

(72) Inventors: Grace Jansen, Southampton (GB); Samuel B. Hawker, Winchester (GB); Bhavnit Patel, Luton (GB); Alexander John Naylor-Teece, Newbury (GB)

(73) Assignee: International Business Machines Corporation, Armonk, NY (US)

(*) Notice: Subject to any disclaimer, the term of this patent is extended or adjusted under 35 U.S.C. 154(b) by 14 days.

(21) Appl. No.: 17/347,759

(22) Filed: Jun. 15, 2021

(65) Prior Publication Data
US 2022/0398189 A1 Dec. 15, 2022

(51) Int. Cl.
*G06F 11/36* (2006.01)
*G06F 9/50* (2006.01)
*G06F 11/34* (2006.01)

(52) U.S. Cl.
CPC ........ *G06F 11/3692* (2013.01); *G06F 9/5011* (2013.01); *G06F 11/3433* (2013.01); *G06F 11/3688* (2013.01)

(58) Field of Classification Search
CPC ............ G06F 11/3692; G06F 11/3632; G06F 8/3433; G06F 8/3688
USPC .................................. 717/120–140
See application file for complete search history.

(56) References Cited

U.S. PATENT DOCUMENTS

| 6,457,143 B1* | 9/2002 | Yue ........................ H04L 43/50 714/43 |
| 6,704,721 B1* | 3/2004 | Hellerstein ........... G06F 16/284 707/999.102 |
| 8,972,986 B2* | 3/2015 | Palanisamy ........... G06F 9/5066 718/1 |

(Continued)

FOREIGN PATENT DOCUMENTS

| CN | 104142860 A | 11/2014 |
| CN | 106713069 A | 5/2017 |
| CN | 111158895 A | 5/2020 |

OTHER PUBLICATIONS

Yang et al, "MIRAS: Model-based Reinforcement Learning for Microservice Resource Allocation over Scientific Workflows", IEEE, pp. 122-132 (Year: 2019).*

(Continued)

*Primary Examiner* — Anil Khatri
(74) *Attorney, Agent, or Firm* — Anthony M. Pallone

(57) ABSTRACT

A method for adjusting the resource allocation ratio between microservices used to run an application. A microservice test sequence is defined which has an order that follows the traffic flow through the microservices. Each microservice is analyzed in order of the test sequence to classify whether or not it is acting as a bottleneck for the application. This is done by measuring whether or not decrementing the microservice's resource causes the application throughput to decrease. For each microservice classified as a bottleneck and in reverse order of the test sequence, its resource is successively incremented until the application throughput starts to increase, indicating it is no longer acting as a bottleneck. The resource allocation ratio can then be adjusted to reflect this procedure.

20 Claims, 6 Drawing Sheets

(56) References Cited

U.S. PATENT DOCUMENTS

| | | | |
|---|---|---|---|
| 9,432,256 B2 | 8/2016 | Terayama | |
| 9,529,768 B2 | 12/2016 | Chu | |
| 9,588,820 B2 | 3/2017 | Ravi | |
| 9,710,535 B2 | 7/2017 | Aizman | |
| 9,716,617 B1* | 7/2017 | Ahuja | H04L 41/0803 |
| 10,178,045 B2* | 1/2019 | Kumar | H04L 47/826 |
| 10,642,982 B2* | 5/2020 | Ahuja | H04L 63/1425 |
| 10,659,496 B2* | 5/2020 | Ahuja | H04L 63/1408 |
| 10,680,918 B1* | 6/2020 | Mazzitelli | H04L 67/51 |
| 10,740,112 B2* | 8/2020 | Fichtenholtz | G06F 9/5027 |
| 10,938,691 B1* | 3/2021 | Bonas | H04L 67/56 |
| 11,012,520 B2 | 5/2021 | Gunjal | |
| 11,070,595 B1* | 7/2021 | Asveren | H04L 65/1104 |
| 11,184,241 B2* | 11/2021 | Schermann | H04L 41/0816 |
| 11,283,900 B2* | 3/2022 | Myers | H04L 67/34 |
| 11,347,622 B1* | 5/2022 | Agarwal | G06F 11/3466 |
| 11,506,686 B2* | 11/2022 | McAleenan | H01P 3/12 |
| 2009/0183168 A1 | 7/2009 | Uchida | |
| 2019/0158416 A1 | 5/2019 | Aronovich | |
| 2020/0026633 A1* | 1/2020 | Gottin | G06F 11/3423 |
| 2022/0164186 A1* | 5/2022 | Pamidala | G06F 9/5072 |

OTHER PUBLICATIONS

Jindal et al, "Performance Modeling for Cloud Microservice Applications", ACM, pp. 25-32 (Year: 2019).*

Camargo et al., "An Architecture to Automate Performance Tests on Microservices", ACM pp. 1-8 (Year: 2016).*

Zhang et al., "Sinan: ML-Based and QoS-Aware Resource Management for Cloud Microservices", ACM, pp. 167-181 (Year: 2021).*

Park et al, "GRAF: A Graph Neural Network based Proactive Resource Allocation Framework for SLO-Oriented Microservices", ACM, pp. 154-167 (Year: 2021).*

Rai et al, "Generalized Resource Allocation for the Cloud", ACM, pp. 1-12 (Year: 2012).*

Qaseem et al., "Optimal Resource Allocation for Containerized Cloud Microservices", IEEE, pp. 271-274 (Year: 2022).*

Crawley, "Scaling Microservices: Identifying Performance Bottlenecks," INSTANA, Mar. 22, 2019, Retrieved from the Internet: https://www.instana.com/blog/scaling-microservices-identifying-performance-bottlenecks/, 4 pages.

Istio, "Simplify observability, traffic management, security, and policy with the leading service mesh," Accessed: Mar. 9, 2021, Retrieved from the Internet: https://istio.io/, 7 pages.

Kasemset, "Simulation-Based Procedure for Bottleneck Identification," AsiaSim 2007, CCIS vol. 5, 2007, Springer, https://doi.org/10.1007/978-3-540-77600-0_6, pp. 46-55.

Kubernetes, "Pod Priority and Preemption," Accessed: Jun. 9, 2021, Retrieved from the Internet: https://kubernetes.io/docs/concepts/scheduling-eviction/pod-priority-preemption/, 8 pages.

Mell et al., "The NIST Definition of Cloud Computing", National Institute of Standards and Technology, Special Publication 800-145, Sep. 2011, 7 pages.

Jansen et al., "Resource Allocation in Microservice Architectures," Application No. PCT/EP2022/063718, Filed: May 20, 2022, 29 pages.

International Search Report and Written Opinion of International Application No. PCT/EP2022/063718, dated Sep. 2, 2022, 12 pages.

* cited by examiner

RESOURCE ALLOCATION IN MICROSERVICE ARCHITECTURES

BACKGROUND

The present invention relates generally to the field of computing, and more particularly to improving resource allocation between microservices in a microservice architecture.

In a computer system resource is always finite, even in a public cloud. In a private cloud or an on-premises platform with a more limited resources, optimum resource allocation between processing nodes is even more important. Many computing processes can be characterized by a traffic flow among multiple processing nodes. The simplest topology is a linear traffic flow in the manner of a chain where the computing process proceeds from one node to the next, i.e. the dependencies between nodes are all 1-to-1. In other cases, the topology of the traffic flow may be more complex with a network of dependencies that can be defined by a lattice or mesh, i.e. the traffic flow includes 1-to-many or many-to-many dependencies between nodes (where 'many' signifies 2 or more). For example, the main traffic flow may be linear, but several of the nodes in the linear traffic flow may call other nodes as common utilities. A general aim of a computer system is to maximize traffic flow of a computing process by making an optimum allocation of its finite computing resource among the different processing nodes. This is referred to as optimizing the resource allocation ratio. Traffic flow limitations can be considered in terms of bottlenecks, where a bottleneck is a node whose performance is rate-limiting for the process.

SUMMARY

According to one embodiment of the disclosure, a computer-automated method, computer system, and computer program product for determining resource allocation between a plurality of microservices used to run an application is provided. The embodiment may include receiving as input a sequence for testing the microservices, a minimum performance level of a performance metric which the application is required to meet, and a resource allocation ratio. The embodiment may include allocating a total amount of resource between the microservices according to the resource allocation ratio. For each microservice in order of the sequence for testing, the embodiment may include identifying whether it is a bottleneck for the application by measuring whether an increment or decrement to the total amount of resource allocated to that microservice causes a performance level of the application to increase or decrease respectively. For each microservice identified as a bottleneck in reverse order of the sequence for testing, the embodiment may include applying successive increments to the total amount of resource allocated to that microservice at least until the performance level of the application starts to increase. The embodiment may include determining and outputting a revised resource allocation ratio for the application based on relative amounts of resource allocated to each of the microservices after the increments have been applied to the total amount of resource allocated to those microservices identified as bottlenecks.

In certain embodiments, as part of identifying for each microservice in sequence whether it is a bottleneck, if it is determined that the microservice is not a bottleneck then the amount of resource allocated to that microservice is iteratively decreased at least until the performance level of the application starts to decrease as a consequence. Optionally, the iterative decreases in the amount of resource allocated to a microservice that is not a bottleneck can be continued until the performance level of the application drops to the minimum performance level. Moreover, if further iterative decrements of the amount of resource allocated to a microservice that is not a bottleneck are blocked before the performance level of the application drops to the minimum performance level, then another option for reducing downstream traffic flow is to reduce traffic ingress into the application until the measured performance level drops to the minimum performance level. Determining the revised resource allocation ratio for the application can be further based on the relative amounts of resource allocated to each of the microservices after the decreasing of the amount of resource allocated to those microservices identified as not being bottlenecks.

The method can be extended to include calculating the test sequence for testing the microservices from a service mesh of dependencies between the microservices that can be provided as additional input.

There are many options for choosing a suitable performance metric to use for the testing. For example, the performance metric may relate to: time taken to process a request; throughput rate of processing requests; and error rates of processing requests.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
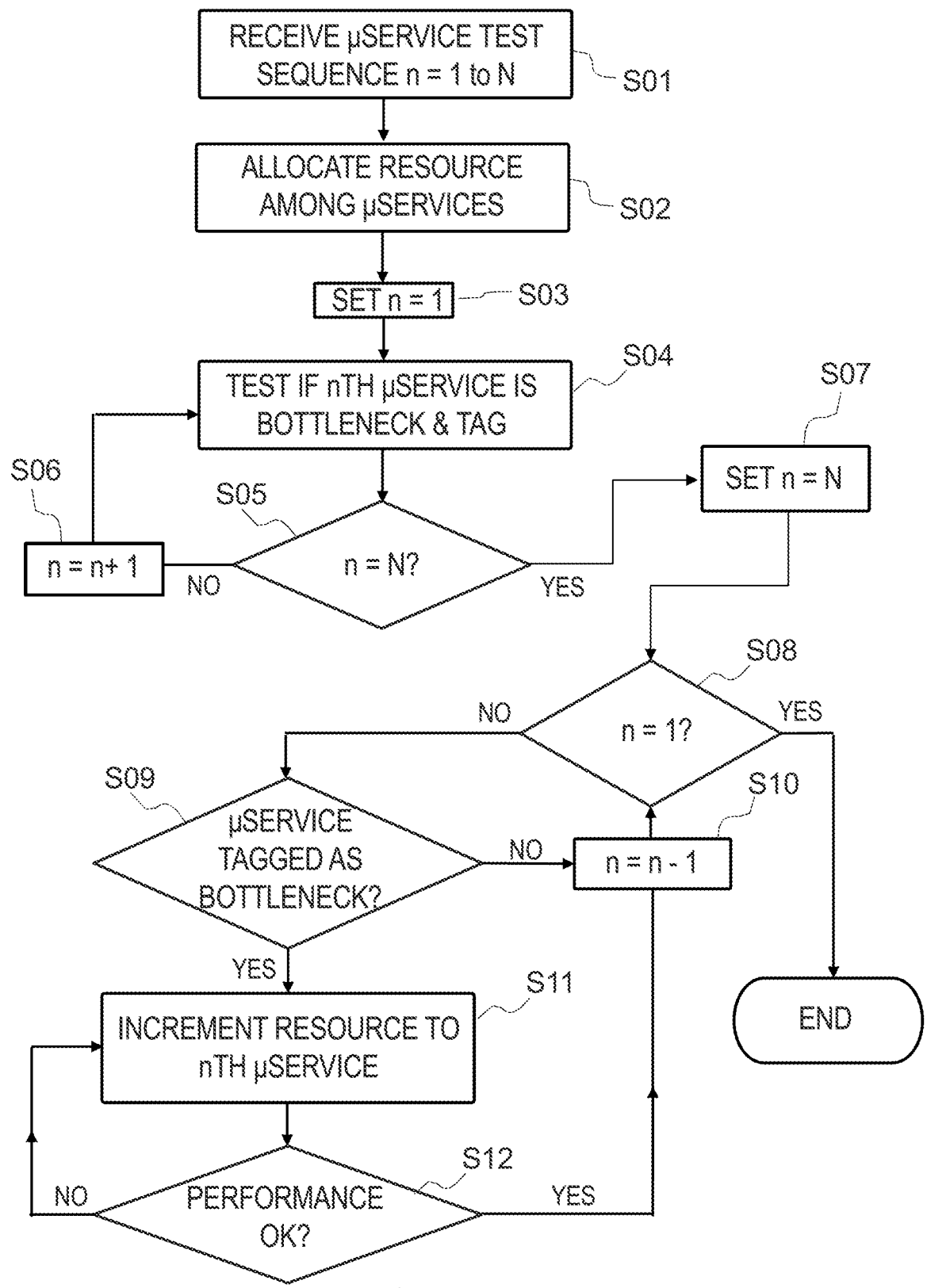
FIG. 1 is a flow diagram of a method for determining an efficient resource allocation between a plurality of microservices used to run an application, according to at least one embodiment.

In a microservice architecture, the processing nodes execute microservices. A microservice architecture decomposes an application into a set of small inter-operating applications. These small applications are the microservices. A single application is thus composed of many loosely coupled and independently deployable smaller components, viz., the microservices. Each microservice focuses on a particular element of functionality separately from higher level services. The microservices concept makes it easier to update and modify applications, since it allows developers to focus on small pieces of functionality without having to understand the system-level operation of the application. The network of dependencies of microservices are referred to in the art as a service mesh.

When running an application based on microservices it is important to apply an efficient allocation of the finite total amount of computing resource between the microservices to allow the application to run as efficiently as possible. The allocation of the total amount of resource among the microservices is done according to a resource allocation ratio. The optimum resource allocation ratio for any given microservice-based application can be expected to stay roughly constant with varying total amount of resource, so the ratio can be applied as and when the total amount of resource is scaled up or down based on any relevant criteria.

Consider the following example. A private cloud platform environment hosts multiple microservice-implemented applications as a Platform-as-a-Service (PaaS), and the applications are exposed to the public internet. The PaaS receives as input service request traffic as data ingress from the public internet and outputs results traffic as data egress to the public internet. An important factor for traffic flow in a microservice architecture is allocation of connections between microservices, e.g. from a connection pool. In our example, the PaaS has an ingress application load balancer (ALB) which is a microservice with the function of managing resource allocation between applications for servicing the traffic ingress. The applications manage their communication with the ALB microservice via respective front-end microservices. If a bottleneck is detected by an admin tool for bottleneck identification and it is detected that the ALB microservice is operating at full resource usage, it may be tempting to infer that the bottleneck is being caused by lack of resource allocation to the ALB microservice. However, this is not necessarily the case and scaling up the resource allocated to the ALB microservice might not have any positive effect but may rather merely increase resource consumption for no benefit. This situation may arise, if the ALB microservice is over-allocating connections to other microservices, i.e. allocating connections that are not being used at all, or not being re-used often enough to make their allocation worthwhile. The ALB may have made an over-allocation of connections in an attempt to compensate for one or more bottlenecks further 'downstream' in the traffic flow within the microservice architecture.

While there are existing solutions for detecting bottlenecks in microservice architectures, these are not always reliable, since identifying bottlenecks is not a trivial problem. In particular, there is a lack of technology available to distinguish reliably between what is a real over-allocation of resource and a seeming over-allocation of resource. A real resource over-allocation is characterized by a bottleneck appearing at the microservice that is the root cause of the performance limitation. A seeming resource over-allocation is characterized by a bottleneck appearing at one microservice that has as its root cause of performance limitation the performance of another microservice that is located further downstream in the traffic flow.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Embodiments of the disclosure relate to an application implemented with microservices and how to determine an allocation of resources between the microservices, i.e. a resource allocation ratio, that allows the application to run most efficiently with a given amount of total resource.

FIG. 1 is a flow diagram of a computer-automated method for determining a resource allocation ratio used to distribute total resource among the microservices used to run an application. The application is taken as having 'N' microservices. Code for implementing the method can conveniently be incorporated in an ALB microservice, or the method may be implemented with its own dedicated microservice.

In Step S01 as input, the method receives a minimum performance level of a performance metric which the application is required to meet and a resource allocation ratio. The method also receives as input a sequence in which to test resource allocation to each of the 'N' microservices. As an alternative to directly receiving the test sequence, the method may be extended to determine the test sequence from a service mesh. The test sequence reflects the traffic flow through the application, i.e. is based on the dependencies between the microservices for the application as expressed by the application's service mesh.

In Step S02, the test is initialized by applying the resource allocation ratio to a total amount of resource that is available.

In Step S03, a microservice counter 'n' is set to an initial value of n=1 to select the first microservice in the sequence for testing.

In Step S04, for the selected microservice, it is identified whether it is a bottleneck for the application processing by measuring whether a decrement to the amount of resource allocated to that microservice causes the performance level of the application to decrease. If a small variation in the amount of resource given to a microservice is measured to cause a correlated change in overall process performance, according to the performance metric, then this is an indicator that the microservice represents a bottleneck for the application process. Although in principle, an increment could be used instead of a decrement to check for correlation, this would pre-suppose that additional resource was available. Using decrements therefore has the advantage that it will, by definition, operate within whatever resource constraints are current in the system. By contrast, an increment approach would require additional measures such as reserving a proportion of resource in advance for carrying out the test method. Any microservices identified as being bottlenecks are tagged as such. If it is determined that the microservice is not a bottleneck, i.e. no correlation is observed between small variations in its resource and the measured value of the performance metric, then this is taken as an indicator that too much resource is allocated to the microservice. The amount of resource allocated to the microservice is then iteratively decreased until the performance level of the application starts to decrease as a consequence, i.e. until the microservice is on the threshold of becoming a bottleneck, thereby indicating that just enough resource is now allocated to the microservice. Another option is to set a lower threshold for decreasing the resource based on the minimum performance level. In this option, the iterative decrease in the amount of resource allocated to the non-bottleneck microservice is continued further, past the bottleneck threshold, until the performance level of the application is measured to drop to the minimum performance level. In some cases, it may not be possible to reach the minimum performance level, e.g. because the application mandates an absolute minimum resource allocation for a particular microservice, e.g. the ingress microservice, which blocks reducing its resources below a certain level. In such cases, where resources cannot be decremented to the point of reaching the minimum performance level, an alternative measure to restrict traffic flow through the application is to reduce traffic ingress into the application until the measured performance level drops to the minimum performance level so that downstream traffic is reduced.

It is generally preferable that, when testing whether a microservice is a bottleneck or not, a decrement is used rather than an increment, since the former will by definition not make any additional demand on resource.

In Step S05, it is tested whether all microservices have now been tested. If not, then the sequence counter is incremented in Step S06 to select the next microservice and the flow returns to Step S04 to test whether the next microservice is a bottleneck. Once all microservices have been tested, i.e. if n=N, then the flow moves to a second stage for determining how much additional resource needs to be allocated to each bottleneck in order to relieve them.

The second stage proceeds in reverse order of the test sequence so to initialize the sequence counter, in Step S07, the last microservice in the sequence is selected, i.e. n is set to N.

In Step S08, it is tested whether all the microservices have now been processed, and if 'yes', the flow ends. Initially, this is not the case since N>1, so flow proceeds to Step S09.

In Step S09 it is tested whether the nth microservice was tagged as a bottleneck in Step S04. If 'yes' then a resource increment is allocated to that microservice in Step S11 and then in Step S12 it is tested whether the performance level of the application has increased (or increased sufficiently). An increase in performance level of the application indicates that the bottleneck is lifted and the test of Step S12 may be set to give a 'yes' result as soon as the performance level is measured to increase. Optionally Step S12 may be set to a somewhat higher threshold, so that it does not deliver a 'yes' result until more resource is allocated than needed for the onset of scaling of process performance with allocated resource, thereby to give the microservice a margin of excess resource over and above that needed to be at the threshold of being a bottleneck. If Step S12 delivers a 'no' result, then flow returns to Step S11 so that the resource is incremented again. In this way successive resource increments are given to the microservice until the test threshold of Step S12 is reached.

Following a 'yes' result of Step S12, the next microservice (in reverse test sequence order) is selected by decrementing the microservice counter in Step S10 and flow passes again to Step S08.

Once there is a 'yes' result from Step S08, all the microservices have been dealt with in the second stage and the diagnostic part of the method is complete. A revised resource allocation ratio for the application is now definable based on the outcomes of the above increases to the resource allocation(s) to the bottleneck microservice(s) and optionally also the above decreases to the resource allocation(s) to the non-bottleneck microservice(s). The revised resource allocation ratio can then be output for use in future for running the application.

Suitable performance metrics may include, for example: time taken to process a request (i.e. round-trip time from ingress to egress); throughput rate of processing requests; and error rates of processing requests. Processing time may be average time (e.g. mean time) over many requests or a maximum time taken for any one of many requests. Errors may be concurrency limit errors, throughput limit errors, or time-out errors, for example. The performance metric may also be a compound variable taking account of multiple individual factors that are combined in a set way, e.g. with suitable weightings and/or logical tests.

Given a total amount of available resource for a microservice-based application, the proposed method of FIG. 1 can analyze the service mesh and identify which microservices are acting as true bottlenecks and give them more resource, while avoiding the potential pitfall of allocating more resource to microservices that might appear to be acting as bottlenecks but in fact are merely masking the presence of other bottlenecks further downstream in the traffic flow. As well as giving more resource to microservices identified as being true bottlenecks, the method can be used to reduce the resource allocated to other microservices, including those that may have otherwise been over-allocated resources based on a mistaken conclusion that they were true bottlenecks. In this way, the ideal outcome of the method is an optimal allocation of a given amount of total resource such that, if any one of the microservices were allocated less resource, performance of the application would decrease and conversely, if any one of the microservices were allocated more resource, performance of the application would not increase.

As an aside it is noted that an artificial intelligence approach to address the same issue is not expected to be efficient, since it would require a large data set and large amounts of computing resource for the training phase and after training would only have a short useful life because of the rapid evolution that microservice-based application architectures tend to undergo, which would mean that repeated re-training would be needed.

It will be understood that performing the method of FIG. 1 is based on reducing the amount of resource allocated to different individual microservices in turn. This can be done without changing the amount of resource allocated to the other microservices. Alternatively, the test method may be performed under conditions of constant total resource in which case the decrement amounts of resource would be re-allocated by increasing the amounts of resource allocated to the other microservices (following the resource allocation ratio) on an ongoing basis during the test.

The above-described method can be applied in a straightforward manner to linear traffic flow topologies in which the microservices of the application form a simple chain. It is then trivial to set the test sequence, since this will be the chain sequence from ingress to egress. The method may also be applied to applications with more complex topologies. For a more complex topology, first the dependencies need to be determined. There are existing tools to determine service meshes in microservice-based applications which can be used to gather the flow of traffic between microservices by analyzing trace logs. With knowledge of the service mesh, a suitable test sequence can be determined, which involves applying some additional logic to the service mesh, where the additional logic can be expressed by logical rules.

One example rule is that when multiple microservices are dependent on another microservice, then the former has precedence over the latter in the test sequence. For example, consider an application that uses microservices 'a' to 'e'. Microservices 'a' to 'd' are in a linear flow and microservice 'e' is a utility called by each of microservices 'b' and 'd'. Applying the rule thus dictates that 'e' must come after 'b', 'c' and 'd', since 'b', 'c' and 'd' are all dependent on 'e' so have precedence over 'e'. The test sequence here would then be 'a' to 'e'.

Another example rule is that one or more microservices that form an isolated dependency on a single microservice that calls them have precedence over the calling microservice. For example, consider an application that uses microservices 'a' to 'e'. Microservices 'a' to 'c' are in a linear flow and microservice 'b' calls microservice 'd' which in turn calls microservice 'e' which then returns to microservice 'c'. Microservice 'b' thus has an isolated dependency on microservices 'c' and 'd'. Therefore, applying the rule means that 'd' and 'e' take precedence over 'b'. In regards of precedence between 'd' and 'e', this can be decided according to a secondary rule, e.g. with the one having the most traffic being given precedence. If we suppose 'e' has more traffic than 'd', then the test sequence in this example would be as follows: 'e', 'd', 'a', 'b', 'c'.

The method described with reference to FIG. 1 was represented as a diagnostic or calibration tool that runs in a test environment separately from the live running, i.e. instantiation, of the application in the production environment. Namely, in the above description, it was implicitly assumed that the application is run purely to enable the test and thereby determine what adjustment to the resource allocation ratio would improve the efficiency with which the instantiated application will run. It will however be appreciated that the method may also be run alongside the live application in the production environment, so that the resource allocation ratio can be continually or periodically assessed and adjusted based on current application performance and having regard to the current total amount of resource allocated to the application (which may change over time).

Figure 2:
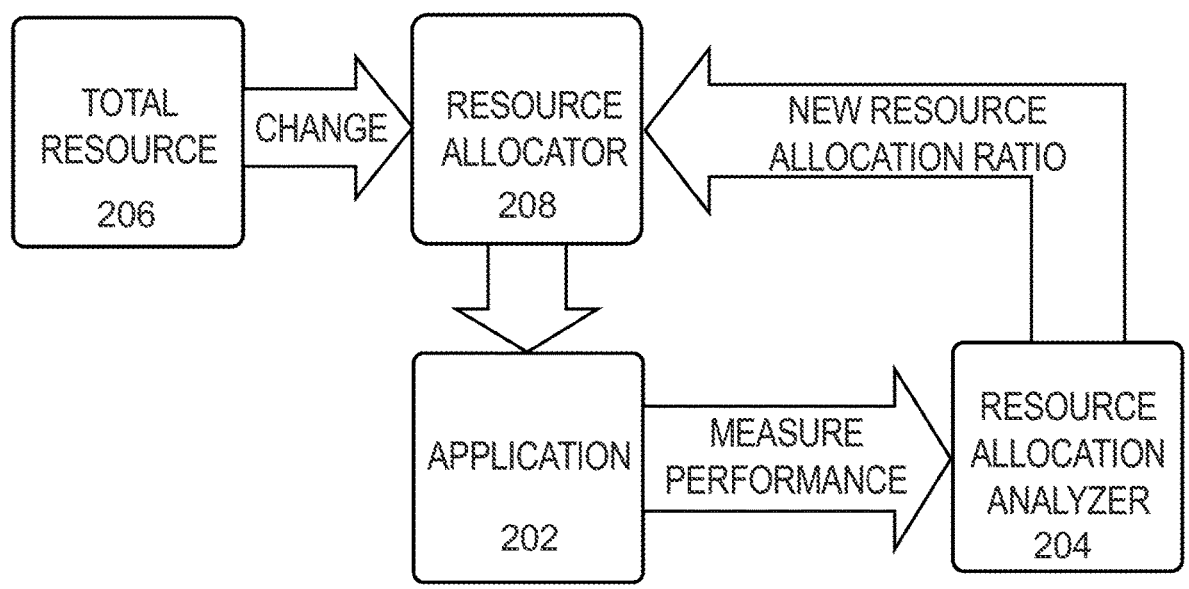
FIG. 2 is a schematic block diagram showing how the method of FIG. 1 is used to control resource allocation to an instantiated microservice-based application, according to at least one embodiment.

FIG. 2 is a schematic block diagram showing the relationship between a live application 202, a resource allocation analyzer 204 component for running the test method of FIG. 1, a total resource 206 component that sets the total amount of resource for the application 202, and a resource allocator 208 for apportioning the total amount of resource according to the current resource allocation ratio. The application 202 runs and its performance is measured according to whatever performance metric is used by the method of FIG. 1. The method of FIG. 1 is run by the resource allocation analyzer 204 which makes small decrements to the resources allocated to each microservice according to the method of FIG. 1 and monitors their effects on the live application, thereby to determine what change to the elements of the resource allocation ratio would improve application performance. The resource allocation analyzer 204 may run the test method only occasionally in either a synchronous or asynchronous manner. For example, running of the test method could be triggered asynchronously based on measured performance dropping below a certain level or by a certain percentage. The running of the test method may also be triggered synchronously, e.g. based on a clock at set time intervals. A combination of asynchronous and synchronous triggers may be used to ensure the test is run at least every so often and in case of significant performance drop-off more frequently. Another option would be to let the test method run continuously, so that once a given test is complete, the next test is started.

Whatever change to the resource allocation ratio is decided upon by the test is then applied by providing the new resource allocation ratio to the resource allocator 208. At the same time as the resource allocation ratio is being monitored and adjusted any changes, made by total resource 206, to the total amount of resource made available to the application 202 are allocated to the microservices according to the then current resource allocation ratio. For example, if through some external agent the total amount of resource is increased (or decreased), this is distributed among the microservices according to the current resource allocation ratio. The continued running of the test method will also ensure that, if the increased (or decreased) total amount of resource results in application bottlenecks shifting to other microservices, then the new optimum resource allocation ratio will be determined and applied automatically. Another example would be if the currently available total amount of resource was critically assessed as part of the test method, so that the method could output a request for additional total resource (or an indication that none is needed), e.g. with reference to the difference between measured actual performance level and desired performance level, which could be dealt with using standard control theory feedback strategies, such as proportional-integral-derivative. For example, if it is not possible to reach the minimum performance level by reducing the resource allocation to one or more non-bottleneck microservices, then this may be an indicator that the total amount of resource is more than adequate.

To set up running the test method of FIG. 1 in parallel with the live application 202 as shown in FIG. 2, it is a prerequisite to assess the application 202 to extract a service mesh from trace logs, from which a suitable test sequence can be determined. This need not be done before the application 202 is instantiated but rather can be done on the instantiated application 202 by applying a service mesh tool as described above. Once the service mesh tool has determined the microservice dependencies, then the resource allocation analyzer 204 can determine a test sequence for the test method of FIG. 1. The service mesh tool may also be run periodically to provide ongoing updates to the current microservice dependencies which can then be used to re-calculate the test sequence to be used in the test method, thereby taking account of any evolution in how the application 202 is running.

According to one embodiment, the method FIG. 1 may execute in parallel to a running a microservice-based application which applies a resource allocation ratio to allocate a total amount of resource between its microservices. Dependencies between the microservices of the application may be assessed. A sequence for testing the microservices, taking account of their dependencies, may be determined. A minimum performance level of a performance metric which the application is required to meet may be set. For each microservice in order of the test sequence, it may be identified whether it is a bottleneck for the application by measuring whether an increment or decrement to the amount of resource allocated to that microservice causes the performance level of the application to increase or decrease respectively. For each microservice identified as a bottleneck in reverse order of the test sequence, successive increments to the amount of resource allocated to that microservice may be applied at least until the performance level of the application starts to increase. Increasing the amount of resource allocated to microservices identified as bottlenecks can be done by increasing the total amount of resource or by maintaining the total amount of resource constant. The test method can run while varying the total amount of resource, these changes to the total amount of resource can be allocated according to the current resource allocation ratio.

Figure 3:
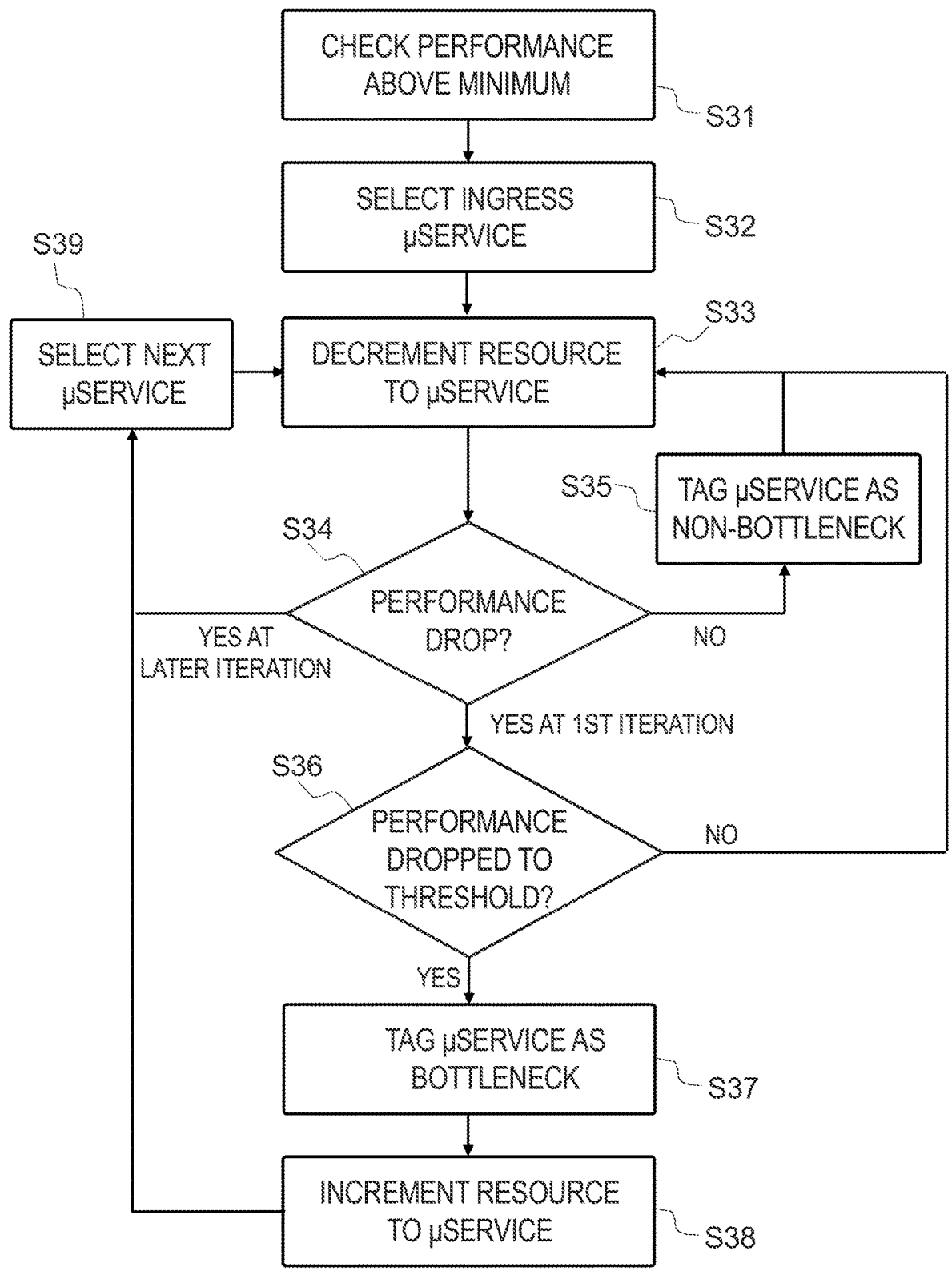
FIG. 3 is a flow diagram of a specific example for implementing the method of FIG. 1, according to at least one embodiment.

FIG. 3 is a flow diagram of a specific example of the test method.

In Step S31 it is tested to make sure that the application is running to at least the minimum performance level of a performance metric which the application is required to meet, the performance metric being some measurable aspect of traffic flow for processing a request from ingress to egress.

In Step S32, according to a sequence for testing the microservices, the first microservice in the sequence is selected for testing its resource allocation, i.e. the ingress microservice.

In Step S33, it is tested whether the ingress microservice is a bottleneck for the application by making an incremental reduction, i.e. decrement, to its resource allocation. This decrement is applied whether or not the ingress microservice is known to be fully loaded or not, i.e. load state of the ingress microservice is ignored for the purposes of the test and hence not taken as flagging a bottleneck. The magnitude of the decrement may be user configurable, whether it be a specified amount or a percentage decrease.

In Step S34 it is tested whether the performance of the application has worsened, i.e. the performance metric is measured before and after the decrement in the resource allocation by observing the change in traffic flow.

If the test result is negative, this is an indicator that the microservice is not a bottleneck for the application. This is noted, i.e. stored, in Step S35. This is an indicator that the ingress microservice itself was taking connections that weren't being processed, even if the ingress microservice was running at full usage, so any bottleneck is not at the ingress microservice, but rather must lie further downstream in the application traffic flow. It is therefore sensible to apply one or more further decrements to the resources allocated to the ingress microservice until an application performance reduction is observed. To do this, the flow return to Step S32 to decrement the resource allocation again and then re-apply the test of Step S34. This loop is continued until such time as the test result of Step S34 is positive, i.e. until the microservice has become a bottleneck (within the context of this test, not for the application running according to the resource allocation ratio as used prior to commencement of the test).

If the test result is positive on the first run through Step S34, i.e. after the initial decrement in Step S33, then this is an indicator that the microservice is a bottleneck for the application. Flow proceeds to Step S36 which is a test of whether performance has reduced to the minimum performance level as a result of the decrement. If 'yes', then the fact that the microservice is a bottleneck is noted, i.e. stored, in Step S37, and then in Step S38 an increment is made to the resource allocated to the microservice by an amount equal to the previous decrement in Step S33, thereby returning it to its original value. Flow then passes to Step S39 to select the next microservice for testing—following the test sequence order—and then on to Step S33 again to start testing this microservice. If there is a 'no' result in Step S36, i.e. there is a network traffic reduction but not one that is below the minimum performance level that the user has specified, then the resources are decremented again (and as necessary again) until the minimum performance level has been arrived at.

If the test result is positive only after a subsequent run through Step S34, i.e. after two or more decrements in Step S33, then flow goes directly to Step S39 to select the next microservice in the test sequence and then on to Step S33 again to start testing this microservice.

The intermediate result is therefore a labelling of each microservice as a bottleneck or not (S37, S35). False bottlenecks are therefore not confused with true bottlenecks, as a result of systematically working through the microservices in a sequence that tracks the traffic flow. As described below, microservices identified as non-bottlenecks (whether these would have been falsely identified as bottlenecks or not by some other method) can have their resource decreased, whereas microservices identified as being bottlenecks for the application can have their resource increased.

Even if the ingress microservice is shown to be a bottleneck, it is still important to continue to test the microservices later in the sequence, since the ingress microservice cannot be assumed to be the only bottleneck. Each bottleneck microservice is noted (S36) so that after the test process has gone through all the microservices, the resource allocation ratio can be modified to allocate proportionally more resources to the bottleneck microservices when the application is instantiated.

Now that all of the microservices within the application flow have been analyzed and the true bottlenecks identified, the method can use the intermediate result to relieve any bottlenecks by making appropriate adjustments to the resource allocation ratio. To do this the microservices labelled as bottlenecks are each dealt with in turn in the reverse order of their sequence as used for the diagnostic part of the test method illustrated. Incremental increases are made to the available resources working backwards, i.e. beginning with the last microservice in the application flow as defined by the test sequence. Each bottleneck microservice has its resource allocation incremented until a measurable increase in the application's throughput performance is measured. The amount of increase in resource allocation of this microservice represents the ratio of resource allocation it needs in relation to the other microservices within the application flow to avoid a bottleneck persisting for this microservice. This procedure is then be repeated for every bottleneck microservice upstream as defined by the reverse test sequence. The resulting resource allocations then define the new resource allocation ratio to be applied to the application.

The special case of a microservice of constant throughput is now considered; specifically how to disambiguate such a microservice from a bottleneck microservice. As already described, if after increasing the resource allocation of this bottleneck microservice, performance of the application, e.g. throughput traffic, is observed to increase, then it can be deduced that the bottleneck can be unplugged by further increasing the resource allocation up to the point at which further increases cease to improve performance. On the other hand, if a first and one or more subsequent increments of resource allocation to a bottleneck microservice is observed to have no effect on performance of the application, then it can be deduced that the bottleneck microservice is a microservice with constant throughput, i.e. one which cannot have its bottleneck unplugged by giving it more resources. For a microservice of constant throughput, the optimum resource allocation is the minimum needed to provide throughput at the constant value, so it can have its resources reduced to this minimum, i.e. the minimum needed to maintain its current performance for the application.

The calculated optimum resource allocation ratio can be used to react to changes in the total amount of resource available, e.g. to react to capacity increases (or decreases) of the infrastructure, e.g. if a worker node or data center is added. The proposed method can therefore eliminate bottlenecks from the service mesh. Specifically, the proposed method can distinguish between true bottlenecks and false bottlenecks, in particular the method avoids a false identification of the ingress microservice as a bottleneck based on an observation that it is running at full usage, which may only be because it is over-allocating connections to other microservices in an attempt to relieve downstream bottlenecks.

Figure 4:
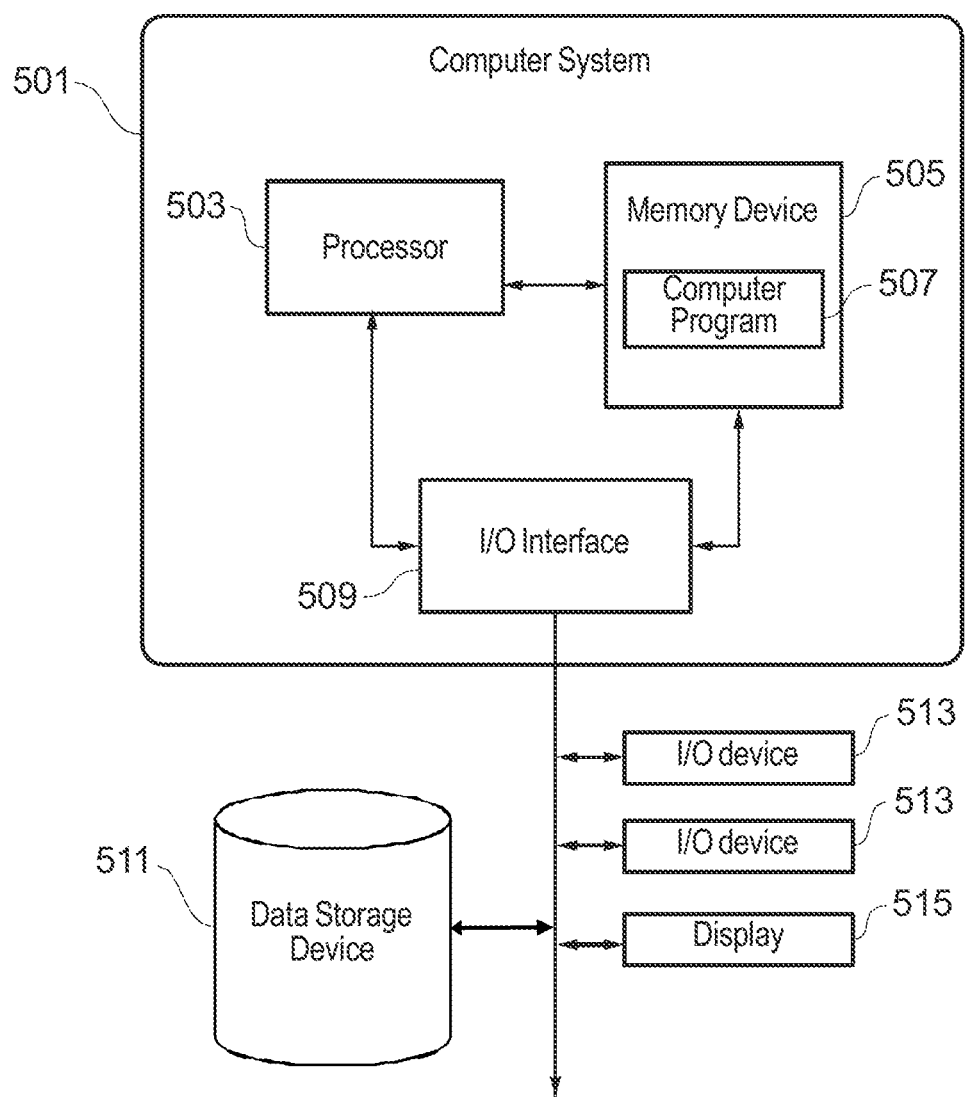
FIG. 4 is a functional block diagram of a generic computer device which may be used as part of a computer system for implementing the method of FIG. 1, according to at least one embodiment.

FIG. 4 shows a structure of a computer system 501 and computer program 507 that may be used to implement embodiments of the disclosure, wherein the computer system may be a network node, such as a client or a server, such as the application server or third party server referred to above, and the computer program 507 may be an app or a microservice as referred to above. The computer system 501 comprises a processor 503 to provide a processor resource coupled through one or more I/O interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 to provide a memory resource contains stored computer program 507, which is a computer program that comprises computer-executable instructions. The data storage devices 511 may store the computer program 507. The computer program 507 stored in the storage devices 511 is configured to be executed by processor 503 via the memory devices 505. The processor 503 executes the stored computer program 507.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is to be understood that although this disclosure includes a detailed description on cloud computing, implementation of the teachings recited herein are not limited to a cloud computer system. Rather, embodiments of the present invention are capable of being implemented in conjunction with any other type of computer system now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computer system is service oriented with a focus on statelessness, low coupling, modularity, and semantic interoperability. At the heart of cloud computing is an infrastructure that includes a network of interconnected nodes.

Figure 5:
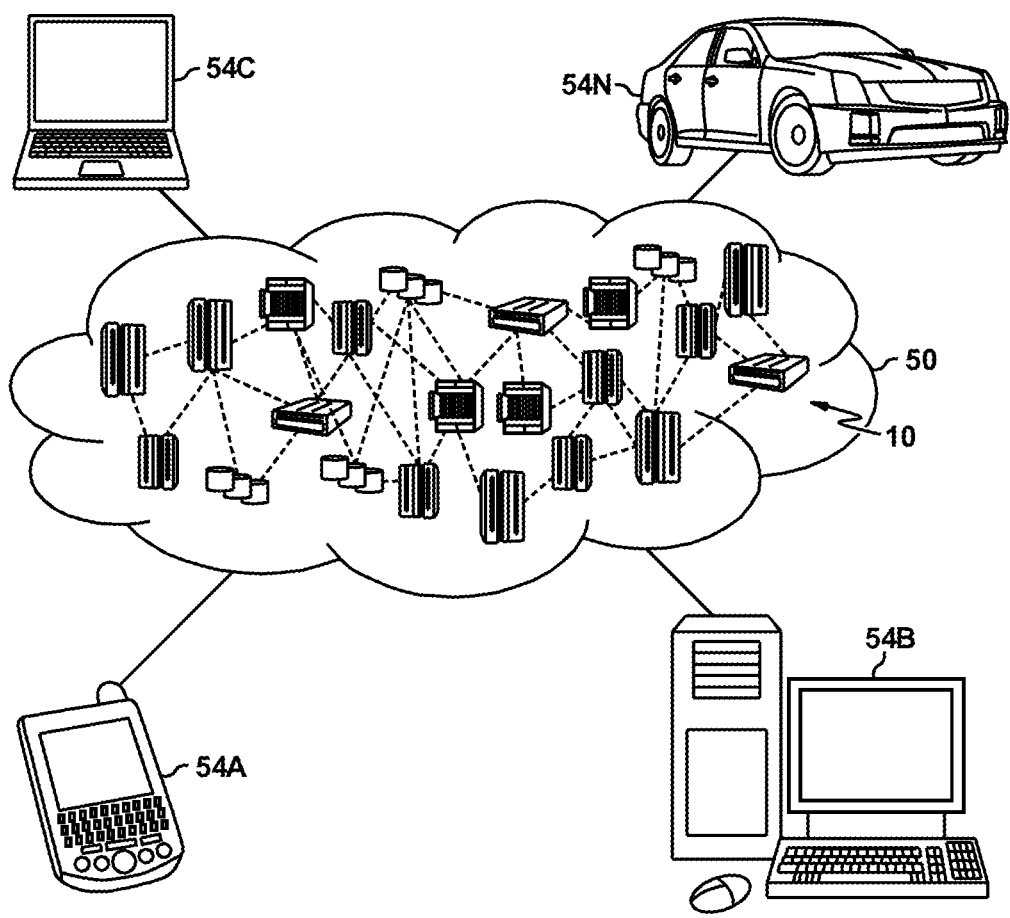
FIG. 5 depicts a cloud computing environment according to an embodiment of the present invention.

Referring now to FIG. 5, illustrative cloud computer system 50 is depicted. As shown, cloud computer system 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computer system 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computer system 50 can communicate with any type of computerized device over any type of network and/or network addressable connection (e.g., using a web browser).

Figure 6:
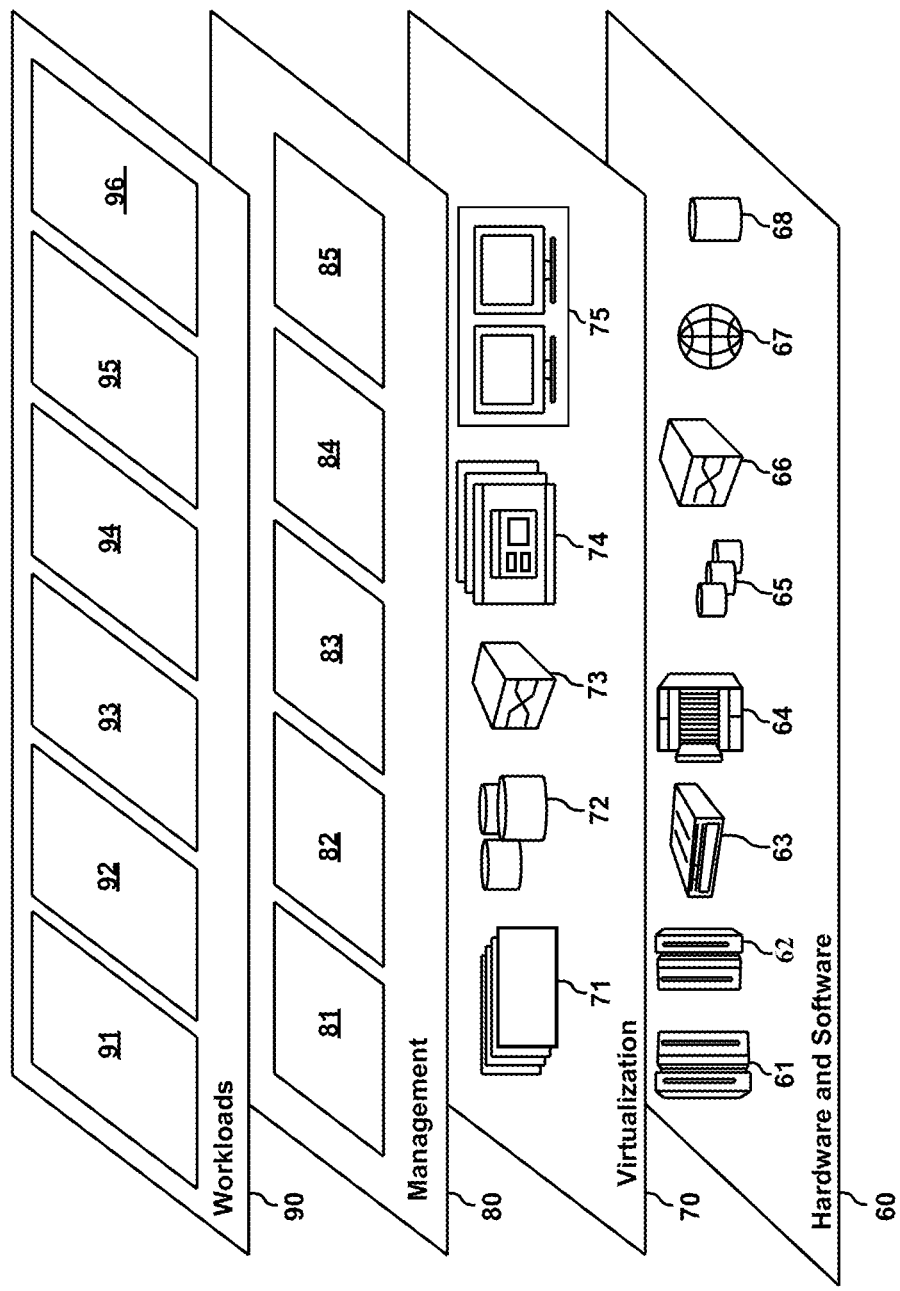
FIG. 6 depicts abstraction model layers according to an embodiment of the present invention.

Referring now to FIG. 6), a set of functional abstraction layers provided by cloud computer system 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computer system. Metering and Pricing 82 provide cost tracking as resources are utilized within the cloud computer system, and billing or invoicing for consumption of these resources. In one example, these resources may include application software licenses. Security provides identity verification for cloud consumers and tasks, as well as protection for data and other resources. User portal 83 provides access to the cloud computer system for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computer system may be utilized. Examples of workloads and functions which may be provided from this layer include: mapping and navigation 91; software lifecycle management 92; virtual classroom education delivery 93; data analytics processing 94; transaction processing 95; and a computer program component 96 for improving resource allocation between a plurality of microservices that collectively combine to run an application according to embodiments of the disclosure.

It will be clear to one skilled in the art that many improvements and modifications can be made to the foregoing exemplary embodiment without departing from the scope of the present disclosure.

What is claimed is:

1. A computer-automated method for determining resource allocation between a plurality of microservices used to run an application, the method comprising:
   receiving as input a sequence for testing the microservices, a minimum performance level of a performance metric which the application is required to meet, and a resource allocation ratio;
   allocating a total amount of resource between the microservices according to the resource allocation ratio;
   for each microservice in order of the sequence for testing, identifying whether it is a bottleneck for the application, wherein the identifying comprises:
      decrementing, via a resource allocation analyzer, the total amount of resource allocated to that microservice; and
      measuring, via the resource allocation analyzer, a corresponding change in the performance metric below the minimum performance level, wherein the corresponding change worsens performance of the application;
   for each microservice identified as a bottleneck, in reverse order of the sequence for testing, applying successive increments to the total amount of resource allocated to that microservice at least until the performance metric meets the minimum performance level; and
   determining and outputting a revised resource allocation ratio for the application based on relative amounts of resource allocated to each of the microservices after said increments have been applied to the total amount of resource allocated to those microservices identified as bottlenecks.

2. The method of claim 1, wherein as part of identifying for each microservice in sequence whether it is a bottleneck, if it is determined that the microservice is not a bottleneck then iteratively decreasing the total amount of resource allocated to that microservice at least until the performance level of the application starts to decrease as a consequence.

3. The method of claim 2, wherein iteratively decreasing the total amount of resource allocated to a microservice that is not a bottleneck is continued until the performance level of the application drops to the minimum performance level.

4. The method of claim 3, wherein, if further iterative decrements of the total amount of resource allocated to a microservice that is not a bottleneck is blocked before the performance level of the application drops to the minimum performance level, then reduce traffic ingress into the application until the measured performance level drops to the minimum performance level.

5. The method of claim 2, wherein the determining of the revised resource allocation ratio for the application is further based on the relative amounts of resource allocated to each of the microservices after said decreasing of the total amount of resource allocated to those microservices identified as not being bottlenecks.

6. The method of claim 1, wherein the sequence for testing the microservices is determined as part of the method and the method has as further input a service mesh of dependencies between the microservices.

7. The method of claim 1, wherein the performance metric relates to at least one of: time taken to process a request; throughput rate of processing requests; and error rates of processing requests.

8. A computer system hosting a microservice-based application which is run by applying a resource allocation ratio to allocate a total amount of resource between the microservices, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
      receiving as input a sequence for testing the microservices, a minimum performance level of a performance metric which the application is required to meet, and the resource allocation ratio;
      allocating the total amount of resource between the microservices according to the resource allocation ratio;
      for each microservice in order of the sequence for testing, identifying whether it is a bottleneck for the application a, wherein the identifying comprises:
         decrementing, via a resource allocation analyzer, the total amount of resource allocated to that microservice; and
         measuring, via the resource allocation analyzer, a corresponding change in the performance metric below the minimum performance level, wherein the corresponding change worsens performance of the application;
      for each microservice identified as a bottleneck in reverse order of the sequence for testing, applying successive increments to the total amount of resource allocated to that microservice at least until the performance metric meets the minimum performance level; and
      determining and outputting a revised resource allocation ratio for the application based on relative amounts of resource allocated to each of the microservices after said increments have been applied to the total amount of resource allocated to those microservices identified as bottlenecks.

9. The computer system of claim 8, wherein as part of identifying for each microservice in sequence whether it is a bottleneck, if it is determined that the microservice is not a bottleneck then iteratively decreasing the total amount of resource allocated to that microservice at least until the performance level of the application starts to decrease as a consequence.

10. The computer system of claim 9, wherein iteratively decreasing the total amount of resource allocated to a microservice that is not a bottleneck is continued until the performance level of the application drops to the minimum performance level.

11. The computer system of claim 10, wherein, if further iterative decrements of the total amount of resource allocated to a microservice that is not a bottleneck is blocked before the performance level of the application drops to the minimum performance level, then reduce traffic ingress into the application until the measured performance level drops to the minimum performance level.

12. The computer system of claim 9, wherein the determining of the revised resource allocation ratio for the application is further based on the relative amounts of resource allocated to each of the microservices after said decreasing of the total amount of resource allocated to those microservices identified as not being bottlenecks.

13. The computer system of claim 8, wherein the sequence for testing the microservices is determined as part of the method and the method has as further input a service mesh of dependencies between the microservices.

14. The computer system of claim 8, wherein the performance metric relates to at least one of: time taken to process a request; throughput rate of processing requests; and error rates of processing requests.

15. A computer program product for determining resource allocation between a plurality of microservices used to run an application, the computer program product comprising:
   one or more computer-readable tangible storage medium and program instructions stored on at least one of the one or more tangible storage medium, the program instructions being executable by a processor capable of performing a method, the method comprising:
      receiving as input a sequence for testing the microservices, a minimum performance level of a performance metric which the application is required to meet, and a resource allocation ratio;
      allocating a total amount of resource between the microservices according to the resource allocation ratio;
      for each microservice in order of the sequence for testing, identifying whether it is a bottleneck for the application a, wherein the identifying comprises:
         decrementing, via a resource allocation analyzer, the total amount of resource allocated to that microservice; and
         measuring, via the resource allocation analyzer, a corresponding change in the performance metric below the minimum performance level, wherein the corresponding change worsens performance of the application;
      for each microservice identified as a bottleneck in reverse order of the sequence for testing, applying successive increments to the total amount of resource allocated to that microservice at least until the performance metric meets the minimum performance level; and
      determining and outputting a revised resource allocation ratio for the application based on relative amounts of resource allocated to each of the microservices after said increments have been applied to the total amount of resource allocated to those microservices identified as bottlenecks.

16. The computer program product of claim 15, wherein as part of identifying for each microservice in sequence whether it is a bottleneck, if it is determined that the microservice is not a bottleneck then iteratively decreasing the total amount of resource allocated to that microservice at least until the performance level of the application starts to decrease as a consequence.

17. The computer program product of claim 16, wherein iteratively decreasing the total amount of resource allocated to a microservice that is not a bottleneck is continued until the performance level of the application drops to the minimum performance level.

18. The computer program product of claim 17, wherein, if further iterative decrements of the total amount of resource allocated to a microservice that is not a bottleneck is blocked before the performance level of the application drops to the minimum performance level, then reduce traffic ingress into the application until the measured performance level drops to the minimum performance level.

19. The computer program product of claim 16, wherein the determining of the revised resource allocation ratio for the application is further based on the relative amounts of resource allocated to each of the microservices after said decreasing of the total amount of resource allocated to those microservices identified as not being bottlenecks.

20. The computer program product of claim 15, wherein the sequence for testing the microservices is determined as part of the method and the method has as further input a service mesh of dependencies between the microservices.

\* \* \* \* \*